United States Patent [19]

Zoche

[11] Patent Number: 5,197,416
[45] Date of Patent: Mar. 30, 1993

[54] RADIAL INTERNAL COMBUSTION ENGINE

[76] Inventor: Michael Zoche, Keferstr. 13, D-8000 Munich 40, Fed. Rep. of Germany

[21] Appl. No.: 919,816

[22] Filed: Jul. 24, 1992

[51] Int. Cl.⁵ .......................................... F02B 75/22
[52] U.S. Cl. ................................ 123/55 A; 123/197.4
[58] Field of Search ............ 123/55 R, 55 A, 55 S R, 123/197.3, 197.4

[56] References Cited

U.S. PATENT DOCUMENTS 2,533,558  12/1950  Chilton .......................... 123/55 A

FOREIGN PATENT DOCUMENTS 9115658  10/1991  PCT Int'l Appl. ............. 123/55 A
496501   12/1938  United Kingdom ............ 123/55 A
535255    4/1941  United Kingdom ............ 123/55 R Primary Examiner—David A. Okonsky
Attorney, Agent, or Firm—Sprung Horn Kramer & Woods

[57] ABSTRACT

An internal combustion engine, especially a radial engine, with a crankcase, a crankshaft, cylinders, connecting rods on the crankshaft, and with pistons attached to the connecting rods and arranged to reciprocate within the cylinders. Each connecting rod is attached with one bearing face on one journal in the crankshaft, has webs on each side of the bearing face, and is attached to the journal by strips that enclose the webs. Each strip enclosing a web on one connecting rod is part of a groove in the journal, whereby space is left, once the connecting rod has been inserted, between the webs and the strips and there is an aperture in the strips for inserting the webs, and hence the connecting rods, large enough to allow insertion of the connecting rods at an angle to their operating states and maintenance therein by the strips that enclose them. Alternatively, the end of the connecting rod toward the piston constitutes a concave bearing face and the piston has a matching convex bearing face with the same radius of curvature. In this version, the radius of curvature is selected such that the articulation between the connecting rod and the piston is above the end of the connecting rod adjacent to the piston.

4 Claims, 4 Drawing Sheets

RADIAL INTERNAL COMBUSTION ENGINE

BACKGROUND OF THE INVENTION

The invention concerns an engine, especially a radial engine, with a crankcase, a crankshaft, cylinders, connecting rods on the crankshaft, and pistons attached to the connecting rods and arranged to reciprocate within the cylinders.

Such internal combustion engines, and especially radial engines with all the connecting rods associated with one system of cylinders extending within the same plane, require complicated structures to attach the connecting rods to the crankshaft. These structures are usually retaining rings in at least two parts or are devices connected to a main connecting rod and resting against the crankshaft with the other connecting rods articulated to them in the capacity of ancillary connecting rods. See K. Gericke, et al, *Triebwerke fur Flugzeuge und Flugkorper*, Darmstadt, Stephan, 1961, 44 & 45 and U.S. Pat. No. 1,545,678.

Assembling such an engine, especially such a radial engine, requires considerable expenditure because the components that attach the connecting rods are difficult to reach. The components are also fairly heavy and constitute a source of dynamic imbalance.

SUMMARY OF THE INVENTION

The principal object of the present invention is accordingly to modify and improve the attachment and positioning of the connecting rods within a radial internal combustion engine. The design is intended to be simpler than prior known designs, with only a few and light-weight components involved, facilitating assembly.

Each connecting rod accordingly has webs on each side of the bearing face, which slides over the crankshaft; the crankshaft has strips that enclose the webs, and each strip has an aperture that accommodates a web and hence a connecting rod.

The aperture is preferably large enough to allow the connecting rods to be inserted at an angle to their operating states and to be maintained therein by the strips that enclose them.

The connecting rod is preferably inserted while the crankshaft is at its "upper dead center" position. The advantage to a radial engine of such an approach to inserting and securing the connecting rods is that the whole cylinder head can be mounted on the crankshaft with the piston and connecting rod already installed as an integrated unit and then attached to the engine housing. This substantially facilitates assembly.

The aforesaid approach to inserting and securing the connecting rods is admittedly preferred for two-cycle engines, including two-cycle Diesel engines because, when the connecting rods are in the operating state, the only forces acting on them and on the piston are compression forces and there is no free access worth mentioning at the upper dead center. The same theory, however, is applicable to four-cycle engines because the resultant forces can be accommodated by the webs and strips no matter what operating state the engine is in.

Forces are transmitted between the crankshaft and the pistons while the engine is operating, although only the force components along the axis of the cylinder are active. Obviously, the more acute the angle between the axis of the cylinder and the longitudinal axis of the connecting rod, the more effectively the forces will be transmitted, because the component forces transmitted by the connecting rod along the axis of the cylinder will then be particularly powerful. The extent of these force components will accordingly depend on the radius of the crankshaft and the length of the connecting rod. When the radii of the crankshaft are given, accordingly, the longer the connecting rods, the more acute can be the angle to the axis of the supply the forces are transmitted at, meaning the distance between where the connecting rod is articulated to the crankshaft and where it is articulated to the piston. The length of the connecting rod can, however, be controlled only to a limited extent and is restricted by the size of the engine. The articulation between the piston and the connecting rod in a conventional engine for example is always below the piston ring.

This is where the present invention is applied, with its object of modifying the attachment between the connecting rod and the crankshaft or piston in order to decrease the angle between the connecting rod and the axis of the cylinder enough to ensure satisfactory transmission of forces.

In this embodiment, the end of the connecting rod toward the piston constitutes a concave bearing face and the piston has a matching convex bearing face. The connecting rod in this design will rotate around the central axis of the two bearing faces. A radius of curvature can easily be selected for the two bearing faces to ensure that the connecting rod's articulation to the piston will be higher than previously. Accordingly, in spite of its smallness, this design will considerably extend the actual length of the connecting rod, which will therefore provide a virtual length longer than its actual length. This makes it possible to keep the angle between the connecting rod and the axis of the cylinder very acute, allowing more effective transmission of forces.

The same approach also makes it possible to make each end of the connecting rod employed in a radial engine almost identical, reducing manufacturing costs.

The connecting rod can be attached to the piston with clamps around the webs on the connecting rod, with the webs distributed on each side of the bearing face.

The bearing face on the piston can, for example, be the surface of a cylindrical segment. The segment is also secured in the piston by the clamps.

The preferred embodiments of the present invention will now be described with reference to the accompanying drawings.

DESCRIPTION OF THE PREFERRED EMBODIMENTS

Figure 1:
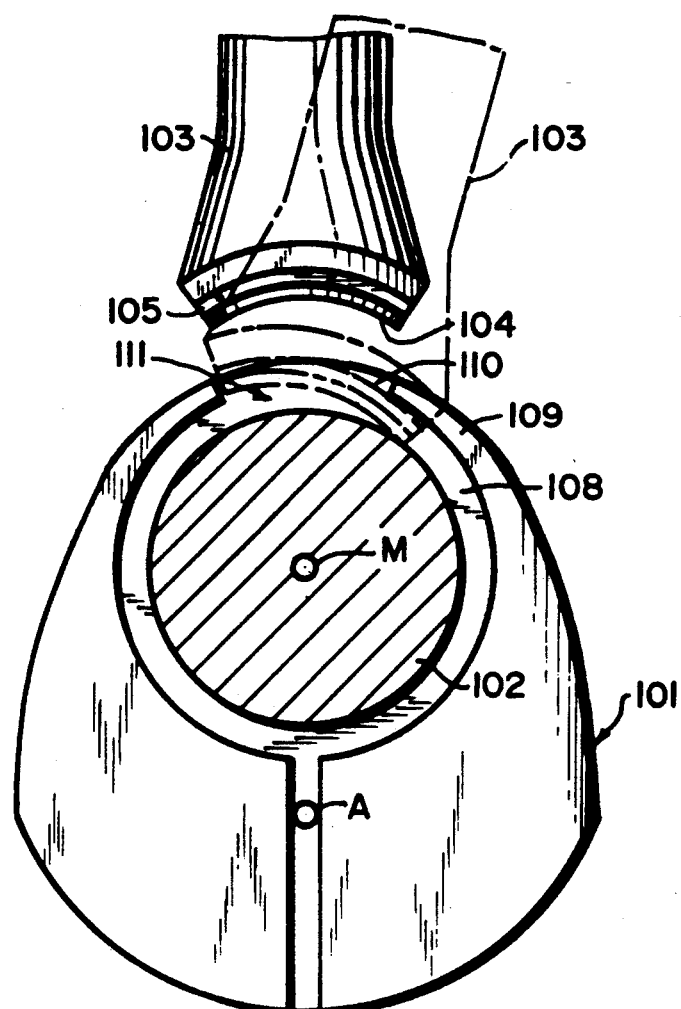
FIG. 1 is a cross-section through a crankshaft and part of a connecting rod showing how it is attached in accordance with the invention.

FIGS. 1 through 4 illustrate a crankshaft 101 with an axis A of rotation and with journals 102, only one of which is illustrated. Journal 102 has a longitudinal axis M. Resting on the journal is a connecting rod 103. A bearing face 104 travels over the circumference of the journal. Paralleling and on each side of the bearing face are coaxial webs 105 that extend over the face's total length. As will be most evident from FIG. 3, there is enough material on each side of the journal 102 to allow a groove 108 around it on each side, resulting in a continuous strip 109 around each side of the journal. In precisely opposite sides of these strips are incisions 110 that constitute an aperture 111 in conjunction with the lines between them on opposite sides as represented by the broken lines in FIG. 4. As will be evident from FIG. 2, the peripheral length of incisions 110 corresponds to a central angle β extending from the center M of journal 102. It will also be evident from this figure that, once a connecting rod 103 has been inserted, the peripheral length of its bearing face 104 will correspond to a central angle α that is more obtuse than angle β.

Figure 2:
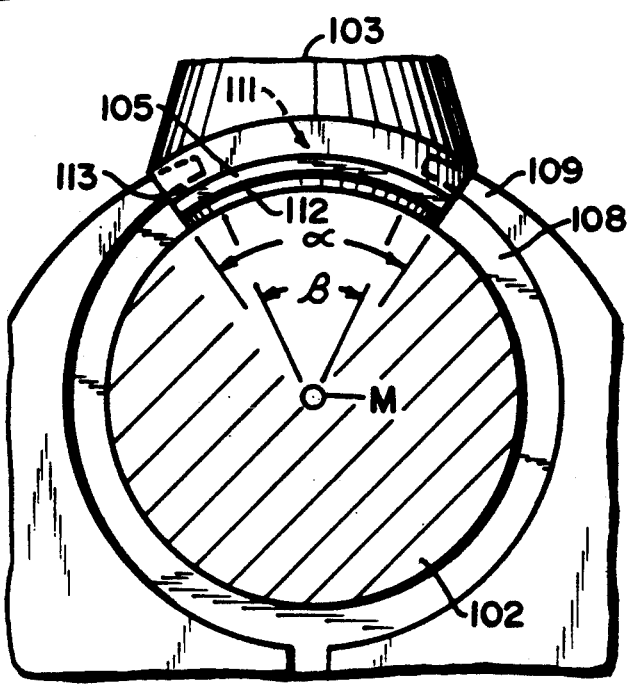
FIG. 2 is a representational diagram showing the attachment mechanism of FIG. 1 with the connecting rod inserted.
Figure 3:
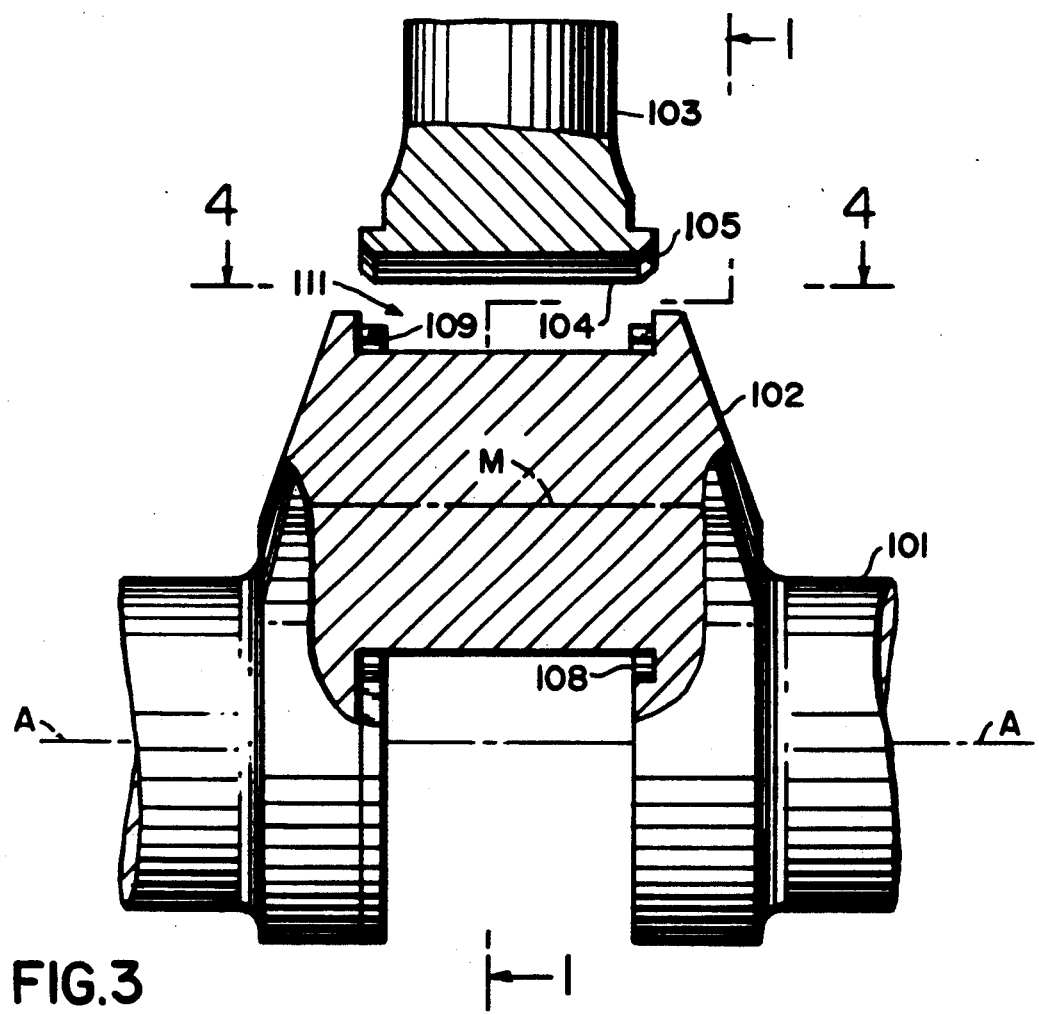
FIG. 3 is a longitudinal section through a crankshaft and a connecting rod to be inserted therein.
Figure 4:
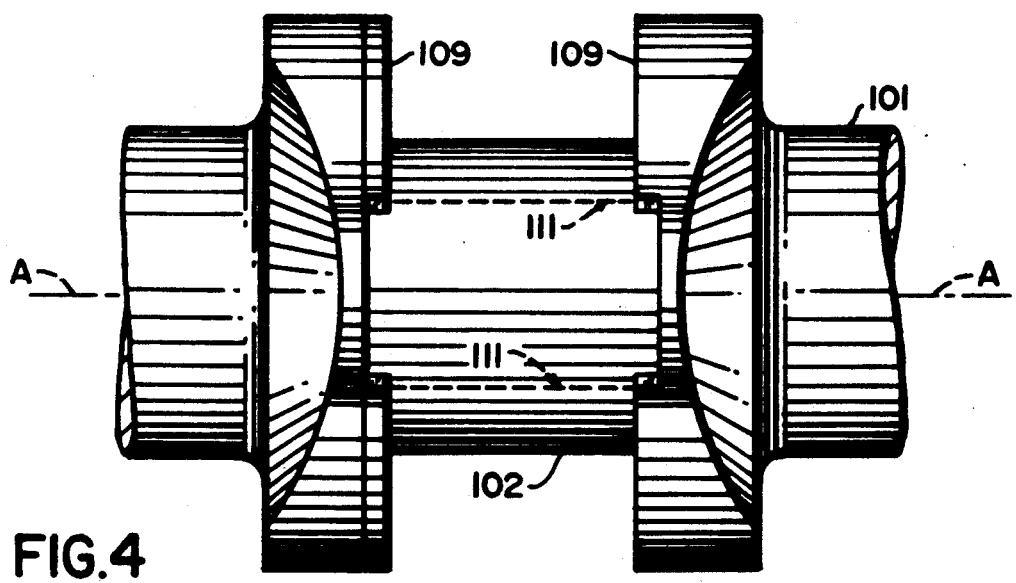
FIG. 4 is a view of a crankshaft with a bilateral aperture to accommodate a connecting rod.

The broken lines in FIG. 1 show how the connecting rod 103 is attached to the journal 102. The webs 105 on each side of bearing face 104 are radially near the bearing face and allow a certain play in relation to strips 109 once the connecting rods have been inserted as represented in FIG. 2. Once the connecting rods have been easily pivoted out of alignment with central axis M and inserted in aperture 111, webs 105 can be inserted below the end of strips 109 until the connecting rods pivot into aperture 111, assuming the operating state illustrated in FIG. 2, with their longitudinal central axis coinciding with the central axis M of the installed cylinder. The connecting rod can in principle be suspended with the crankshaft in any position, although the crankshaft is preferably at "upper dead center."

Figure 5:
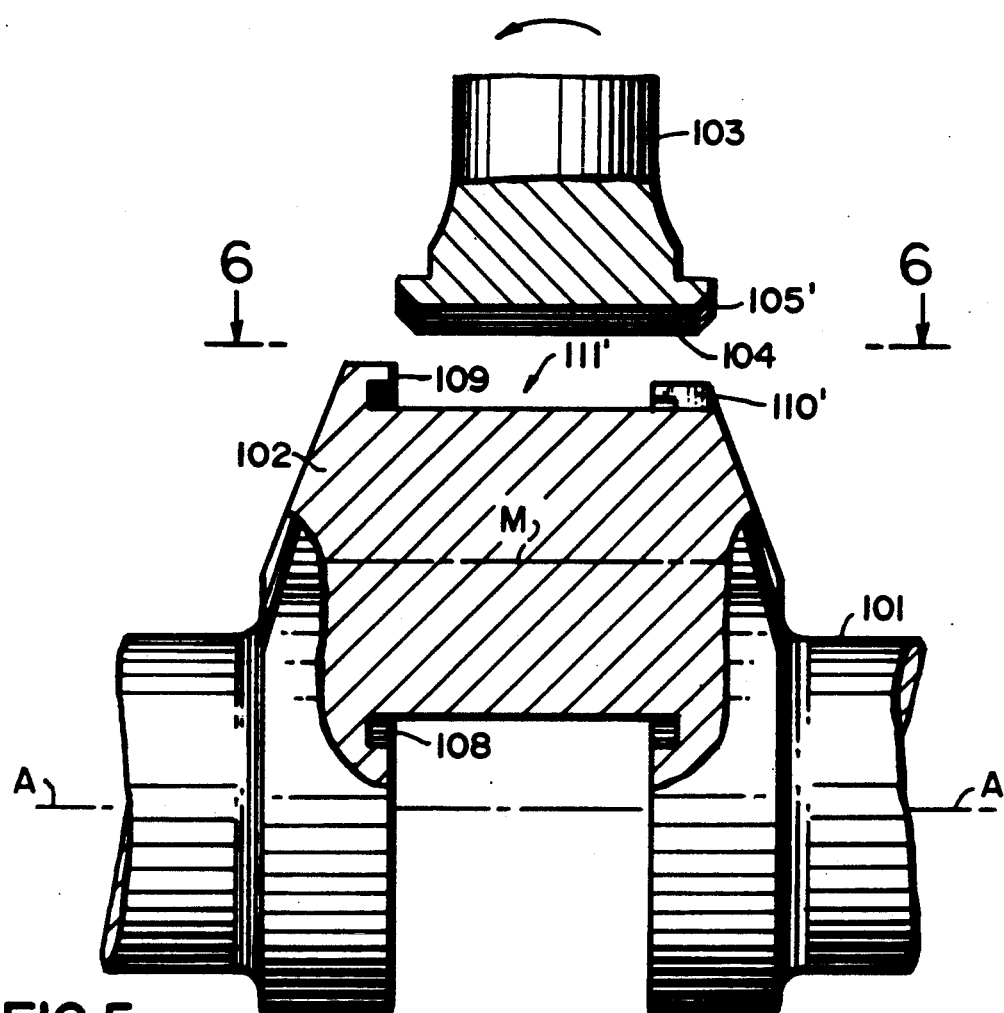
FIG. 5 is a longitudinal section through part of a crankshaft and connecting rod illustrating another embodiment of a connecting rod articulation with a unilateral aperture in the crankshaft.
Figure 6:
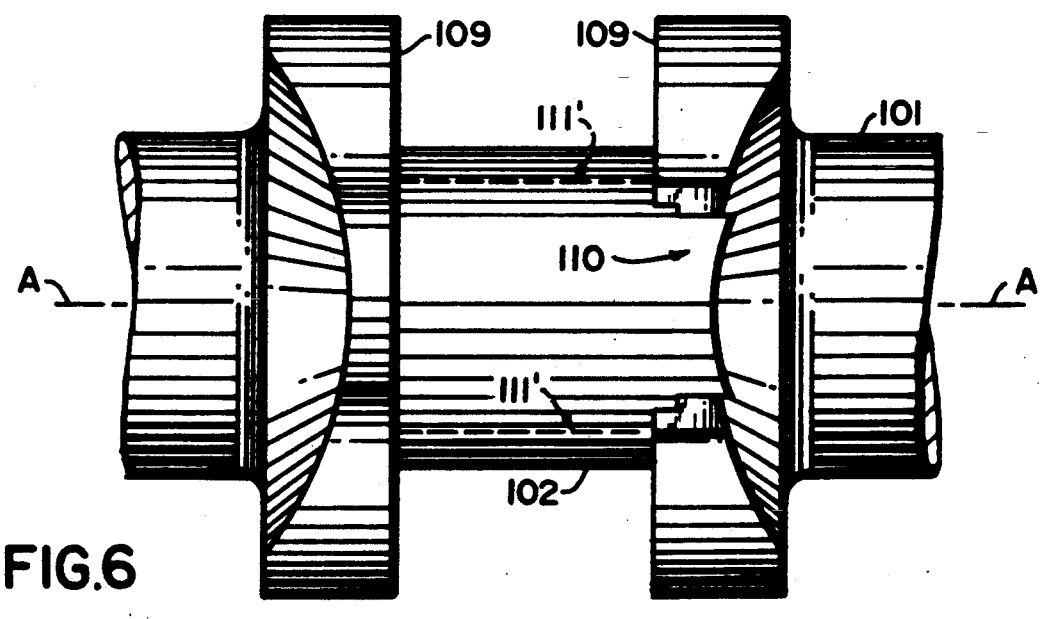
FIG. 6 is a view of the crankshaft with a unilateral aperture.

FIGS. 5 and 6 illustrate a modified embodiment of a connecting rod attachment. Similar parts are labeled with the same reference numbers. The essential difference is that aperture 111' is open on only one side, meaning that only one of the two strips 109 is separated by an incision 110'. The connecting rod in this embodiment is tilted slightly across its direction of motion over the journal in order to insert it into aperture 111' at the "upper dead center" position and is secured in its operating states by the strips 109 on each side. The webs 105 in this version, which are part of the bearing face, constitute a flange on each side of connecting rod 103.

The aperture, whether bilateral or unilateral, in the aforesaid embodiments is open. It is of course also possible to cover the aperture with a spring-loaded shutter once the connecting rod has been inserted.

Figure 7:
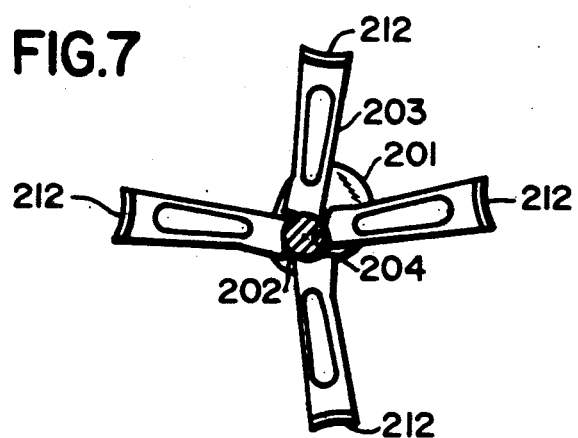
FIG. 7 is a schematic illustration of a crankshaft and connecting rods in a radial engine.

FIG. 7 schematically illustrates a crankshaft 201 with a journal 202 and four connecting rods 203 as employed in a radial engine. The four connecting rods 203 travel over the journal on bearing faces 204 and are similarly secured against it. The connecting rods 203 can be secured to the bearing face as aforesaid by inserting each in an aperture 211 on the journal and securing it therein with strips 209 that enclose webs 205 on each side of the bearing faces 204 on the rods.

Figure 8:
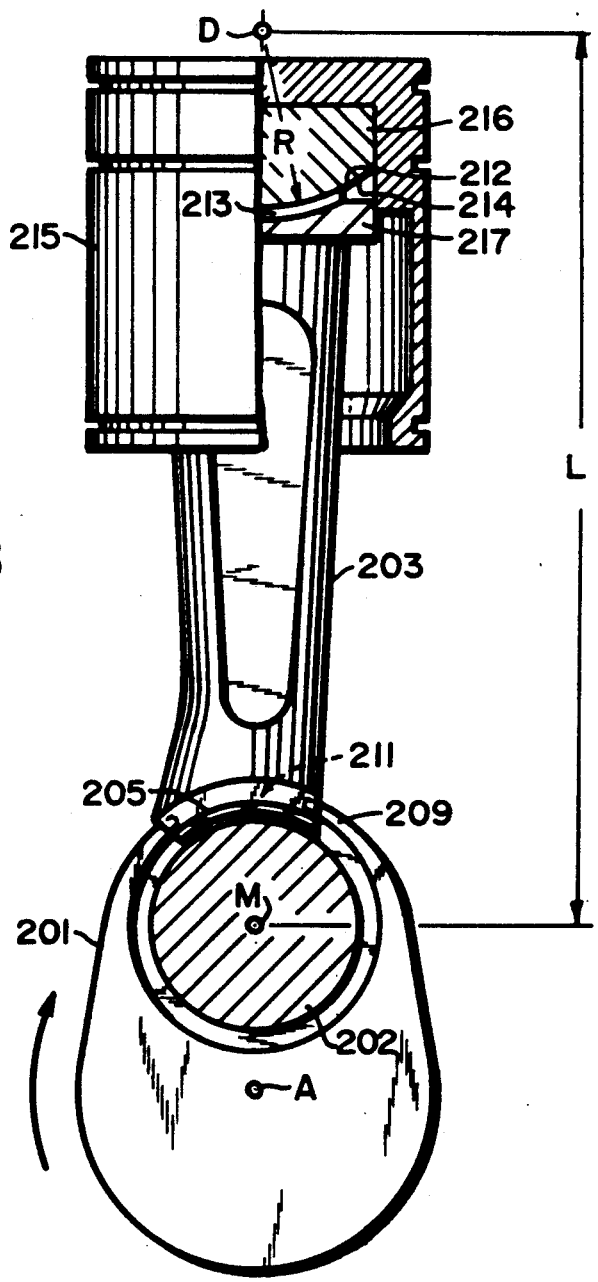
FIG. 8 is a partly sectional view of a crankshaft, connecting rod and piston.

As shown in FIG. 8, the other end of each connecting rod 203 is provided with a concave bearing face 212, again with webs 213 extending in the direction of motion along each side.

The concave bearing face 212 rests on a convex bearing face 214 inside a piston 215 and having a matching radius of curvature. Convex bearing face 214 constitutes the surface of a cylindrical segment 216 accommodated in the piston 215. The connecting rods 203 and the segment 216 are, in turn, fastened to the piston 215 by clamps 217 that rest against the outer surface of the webs 213.

As the crankshaft 201 rotates, the upper ends of the connecting rod 103 pivot around an axis D which, due to the radius R of curvature of the bearing faces 212 and 214, is higher than the pivot axis in conventional connecting rod-piston bolt systems and, in the present embodiment, even away from and above the piston 215. The distance between the central axis M of the journal 202 and the upper connecting-rod axis D constitutes the effective connecting rod length L. This length is accordingly greater than the actual space available between the journal and the top of the piston and can accordingly be varied by selecting different radii R of curvature, allowing the articulation to be in the vicinity of, or even above the upper piston ring.

There has thus been shown and described a novel radial internal combustion engine that fulfills all the objects and advantages sought therefor. Many changes, modifications, variations, and other uses and applications of the subject invention will, however, become apparent to those skilled in the art after considering this specification and the accompanying drawings, which disclose the preferred embodiments thereof. All such changes, modifications, variations, and other uses and applications that do not depart from the spirit and scope of the invention are deemed to be covered by the invention, which is to be limited only by the claims that follow.

What is claimed is:

1. In an internal combustion engine, having a crankcase, a crankshaft, cylinders, connecting rods on the crankshaft, and pistons attached to the connecting rods and arranged to reciprocate within the cylinders, wherein each connecting rod (1) is attached with one bearing face on one journal in the crankshaft, (2) has webs on each side of the bearing face, and (3) is attached to the journal by strips that enclose the webs, the improvement wherein each strip enclosing a web on one connecting rod is part of a groove in the journal, wherein space is left, once the respective connecting rod has been inserted, between the webs and the strips, and wherein an aperture is provided in the strips for inserting the webs, and hence the connecting rods, large enough to allow insertion of the connecting rods at an angle to their operating states while permitting maintenance therein by the strips that enclose them.

2. The engine defined in claim 1, wherein the aperture only interrupts the strips on one side of each connecting rod.

3. The engine defined in claim 1, wherein the webs are part of the bearing face.

4. The engine defined in claim 1, wherein space is left, once each connecting rod has been inserted, between the webs and the surface of the journal.

* * * * *